(12) United States Patent
Guh

(10) Patent No.: US 8,762,394 B1
(45) Date of Patent: *Jun. 24, 2014

(54) METHOD AND APPARATUS FOR OBTAINING RECOMMENDATIONS FROM TRUSTED SOURCES

(75) Inventor: Ramanathan a V. Guh, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/613,361

(22) Filed: Sep. 13, 2012

Related U.S. Application Data

(63) Continuation of application No. 11/334,156, filed on Jan. 17, 2006, now Pat. No. 8,290,964.

(51) Int. Cl.
  *G06F 17/30* (2006.01)
(52) U.S. Cl.
  CPC ................................. *G06F 17/30867* (2013.01)
  USPC .......................................................... 707/751
(58) Field of Classification Search
  CPC ..................... G06F 17/30861; G06F 17/30867
  USPC .......................................................... 707/751
  See application file for complete search history.

(56) References Cited

U.S. PATENT DOCUMENTS

| | | | |
|---|---|---|---|
| 5,884,282 A | 3/1999 | Robinson | |
| 6,438,579 B1 | 8/2002 | Hosken | |
| 6,665,655 B1 | 12/2003 | Warner et al. | |
| 7,092,926 B2 * | 8/2006 | Cerrato | 706/48 |
| 7,707,122 B2 | 4/2010 | Hull et al. | |
| 8,060,463 B1 * | 11/2011 | Spiegel | 707/609 |
| 2002/0062368 A1 * | 5/2002 | Holtzman et al. | 709/224 |
| 2003/0055898 A1 * | 3/2003 | Yeager et al. | 709/205 |
| 2003/0131000 A1 | 7/2003 | Bates et al. | |
| 2004/0088355 A1 * | 5/2004 | Hagan et al. | 709/203 |
| 2006/0218153 A1 | 9/2006 | Voon et al. | |
| 2007/0073704 A1 | 3/2007 | Bowden et al. | |
| 2007/0214097 A1 * | 9/2007 | Parsons et al. | 706/12 |
| 2008/0005064 A1 | 1/2008 | Sarukkai | |
| 2008/0097822 A1 | 4/2008 | Schigel et al. | |

* cited by examiner

*Primary Examiner* — Jensen Hu
(74) *Attorney, Agent, or Firm* — Fish & Richardson P.C.

(57) ABSTRACT

One embodiment of the present invention comprises a system that provides recommendations to a user. During operation, the system performs a computer-based lookup operation to identify trusted entities that the user trusts (or is likely to trust) to make recommendations. Next, the system performs another computer-based lookup operation to obtain recommendations associated with the identified trusted entities. The system then uses the obtained recommendations to provide recommendations to the user. In a variation on this embodiment, the system additionally receives information indicating that the user trusts recommendations associated with an entity. The system then stores a corresponding record for the trust relationship between the user and the trusted entity in a computer-based lookup structure to facilitate subsequently identifying trusted entities that the user trusts to make recommendations.

39 Claims, 2 Drawing Sheets

METHOD AND APPARATUS FOR OBTAINING RECOMMENDATIONS FROM TRUSTED SOURCES

CROSS-REFERENCE TO RELATED APPLICATIONS

This application is a continuation of, and claims priority under 35 U.S.C. §120 to, U.S. patent application Ser. No. 11/334,156, filed Jan. 17, 2006, the entire contents of the previous application is hereby incorporated by reference.

BACKGROUND

1. Field of the Invention

The present invention relates to computer-based systems for providing recommendations. More specifically, the present invention relates to a method and an apparatus that facilitate providing and obtaining recommendations from trusted sources.

2. Related Art

One of the great advantages of the Internet is that it enables a large community of users to provide and obtain recommendations from each other.

These recommendations can cover items as diverse as web sites, hotels, movies, books, and in general most types of products and services. In fact, many popular web sites, such as Eopinions or CNET, are primarily devoted to facilitating dissemination of such recommendations.

Users generally find recommendations provided by a large group of users to be useful in making decisions about specific items. However, recommendations for some items, such as books or movies, are highly subjective. Some users may like a particular book while other users do not. For these types of "subjective" items, it is important to be able to "trust" the source of the recommendations. For example, a user may trust a recommendation provided by his brother-in-law about a movie because the user has similar tastes in movies to his brother-in-law, whereas the user may place less trust in recommendations for the movie provided by the general public.

Unfortunately, the extent to which a user trusts another user to make recommendations is itself highly subjective. It is consequently hard to incorporate such trust information into systems which provide recommendations.

SUMMARY

One embodiment of the present invention comprises a system that provides recommendations to a user. During operation, the system performs a computer-based lookup operation to identify trusted entities that the user trusts (or is likely to trust) to make recommendations. Next, the system performs another computer-based lookup operation to obtain recommendations associated with the identified trusted entities. The system then uses the obtained recommendations to provide recommendations to the user.

In a variation on this embodiment, identifying the trusted entities involves performing a topic-specific lookup operation, which identifies trusted entities that the user trusts to make recommendations for a specific topic.

In a variation on this embodiment, obtaining the recommendations associated with the identified trusted entities involves first performing a transitive search to look up transitively-trusted entities who are trusted by the trusted entities or are trusted by other transitively-trusted entities. The system then obtains recommendations made by both the trusted entities and the transitively-trusted entities.

In a variation on this embodiment, using the obtained recommendations to provide recommendations to the user involves providing the obtained recommendations directly to the user, or alternatively, using the obtained recommendations to influence how search results (which are associated with the obtained recommendations) are sorted and presented to the user.

In a variation on this embodiment, the system receives information indicating that the user trusts recommendations associated with an entity. Upon receiving this information, the system stores a corresponding record for the trust relationship between the user and the trusted entity in a computer-based lookup structure to facilitate subsequently identifying trusted entities that the user trusts to make recommendations.

In a further variation, receiving the information indicating that the user trusts recommendations associated with the entity can involve: (1) receiving input directly from the user indicating the user trusts recommendations associated with the entity; (2) using a web crawler to examine web pages to locate information indicating that the user trusts recommendations associated with the entity; (3) examining web visitation patterns of the user and inferring from the web visitation patterns that the user trusts recommendations associated with the entity; or (4) examining computer-based records belonging to the user, such as an email contact list or an instant-messaging chat list, and inferring from the computer-based records that the user trusts recommendations associated with the entity.

In a further variation, receiving the information indicating that the user trusts recommendations associated with the entity involves receiving information indicating that: (1) the entity has previously made recommendations that the user likes; (2) the entity trusts one or more entities that have previously made recommendations that the user likes; or (3) the entity trusts one or more entities that the user trusts.

In a further variation, receiving the input directly from the user involves detecting an activation of a trust button by the user, wherein the trust button is located on a web page belonging to the entity.

In a further variation, using the web crawler to examine the web pages involves using the web crawler to locate: (1) links from the user's web page to web pages belonging to trusted entities; (2) an XML file which identifies entities that the users trusts; and/or (3) a vanity page which identifies entities who trust the owner of the vanity page.

In a variation on this embodiment, the system increases (or decreases) the strength of a trust relationship for a trusted entity when the user follows (or does not follow) a link for a recommendation associated with the trusted entity.

In a variation on this embodiment, the system causes the strength of an existing trust relationship to decay over time.

In a variation on this embodiment, prior to identifying the trusted entities, the system gathers recommendations associated with an entity. This can involve: examining web pages associated with the entity; examining web links which are activated by the entity; or receiving recommendations from applications configured to gather recommendations from the entity. Next, the system stores records for the gathered recommendations in a computer-based lookup structure to facilitate subsequently looking up recommendations associated with the entity.

Table 1 illustrates exemplary specifications in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system.

This includes, but is not limited to, magnetic and optical storage devices, such as disk drives, magnetic tape, CDs (compact discs) and DVDs (digital versatile discs or digital video discs).

System for Providing Recommendations

Figure 1:
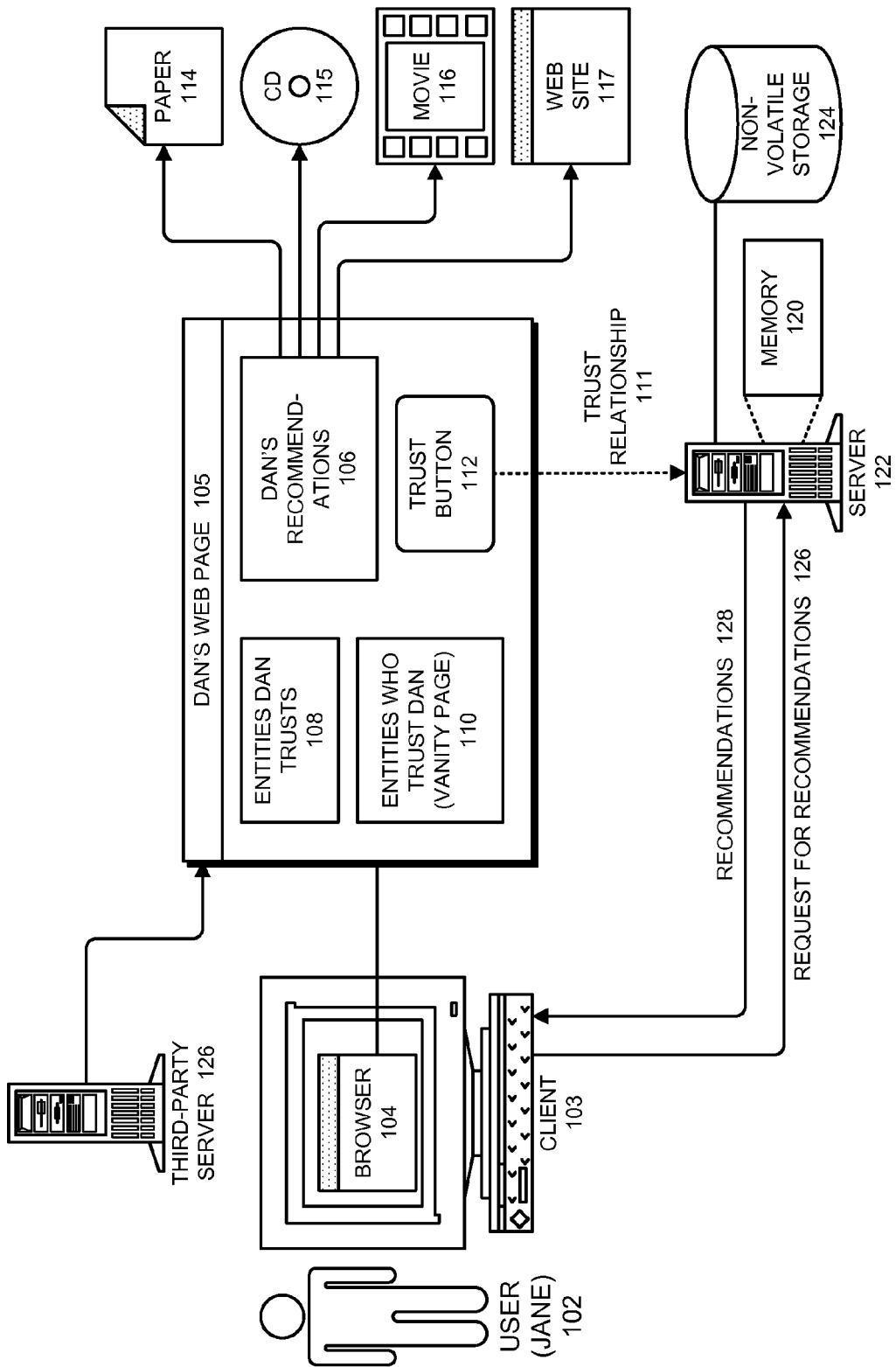
FIG. 1 presents a diagram for a system that provides recommendations in accordance with an embodiment of the present invention.

FIG. 1 presents a diagram illustrating a system that provides recommendations in accordance with an embodiment of the present invention. Referring to FIG. 1, a user 102 operates a browser 104 located on a client 103. Client 103 can generally include any node on a network including computational capability and including a mechanism for communicating across the network. Browser 104 can generally include any type of web browser capable of viewing a web site, such as the INTERNET EXPLORER™ browser distributed by the Microsoft Corporation of Redmond, Wash.

During operation, client 103 can communicate with server 122 to obtain recommendations. Server 122 can generally include any computational node including a mechanism for servicing requests from a client for computational and/or data storage resources. In order to obtain recommendations, client 103 sends a request for recommendations 126 to server 122 and in response receives a set of recommendations 128. Note that the code and data involved in processing this request typically resides within memory 120 within server 122. Copies of the code and data can also reside within non-volatile storage 124, which is attached to server 122.

Browser 104 can also access a web page belonging to a person, or possibly another type of entity such as a company. For example, in FIG. 1 browser 104 accesses Dan's web page 105, which is hosted by a third-party server 126. (Note that Dan's web page can alternatively be hosted by the system server 122).

Dan's web page 105 can generally be any type of web page belonging to the user Dan. For example, Dan's web page 105 can be Dan's personal home page. In addition to the normal items that can appear on a personal home page, Dan's web page 105 can include recommendations 106, which identify (and can possibly provide links to) various items that Dan recommends. For example, these recommendations can be associated with a technical paper 114, a compact disc (CD) 115 containing music, a move 116, or a web site 117. Note that recommendations 106 can also include numerical ratings.

Dan's web page 105 can also include trust information for recommendations. More specifically, Dan's web page 105 can include a list of entities (typically people) who Dan trusts 108. Dan's web page 105 can also include a "vanity page" 110 listing people (entities) who trust Dan.

In one embodiment of the present invention, a "web crawler" obtains the above-described recommendation and trust information and sends it to server 122 to facilitate providing recommendations. This process is described in more detail below with reference to FIGS. 2-4.

Dan's web page 105 can also include a "trust button" 112. A user 102 visiting Dan's web page can click on trust button 112 to cause a corresponding trust relationship 111 to be recorded on server 122. This trust relationship 111 indicates that user 102 trusts recommendations made by Dan. Note that if Dan's web page 105 is provided by a third-party server 126, the trust button 112 can be implemented as an "inline frame" (iframe) provided by server 122, which examines a cookie to identify user 102 and then provides an identifier for the user and an identifier for Dan to server 122.

Obtaining and Storing Trust Information

Figure 2:
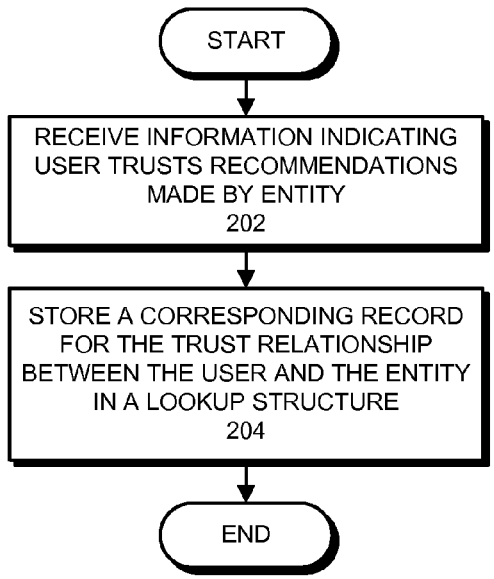
FIG. 2 presents a flow chart illustrating the process of obtaining and storing trust information in accordance with an embodiment of the present invention.

FIG. 2 presents a flow chart illustrating the process of obtaining and storing trust information in accordance with an embodiment of the present invention. During this process, the system first receives information indicating that the user trusts recommendations made by the entity (step 202). This can involve receiving this information directly from the user. For example, the user can click on a "trust button" on a web page belonging to the entity, which causes a corresponding record for a trust relationship to be recorded on the server. In general any type of input from the user indicating that such as trust relationship exists can be used.

The system can also use a web crawler to examine web pages to locate information indicating that the user trusts recommendations associated with the entity. While examining web pages, the web crawler can look for a number things, including: (1) links from the user's web page to web pages belonging to trusted entities; (2) an XML file which identifies entities that the users trusts; or (3) a vanity page which identifies users who trust the owner of the vanity page.

The system can also examine web visitation patterns of the user and can infer from the web visitation patterns that the user trusts recommendations associated with the entity.

The system can also examine computer-based records belonging to the user, such as an email contact list or an instant-messaging chat list, and can infer from these computer-based records that the user trusts recommendations associated with the entity.

During the above-described operations, a trust relationship between the user and the entity can be inferred if: (1) the entity has previously made recommendations that the user likes; (2) the entity trusts one or more entities that have previously made recommendations that the user likes; or (3) the entity trusts one or more entities that the user trusts.

Next, the system stores a corresponding record for the trust relationship between the user and the entity in a lookup structure (step 204) to facilitate subsequent lookup operations. Note that this lookup structure can include any type of data structure or database system that can facilitate looking up such trust records.

Obtaining and Storing Recommendations

Figure 3:
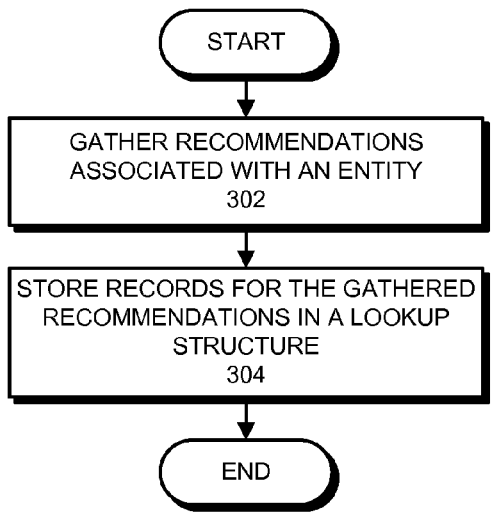
FIG. 3 presents a flow chart illustrating the process of obtaining and storing recommendations in accordance with an embodiment of the present invention.

FIG. 3 presents a flow chart illustrating the process of obtaining and storing recommendations in accordance with an embodiment of the present invention. During this process, the system gathers recommendations associated with an entity (step 302). This can involve using a web crawler to examine web pages associated with the entity to look for recommendations. It can also involve monitoring web links that are clicked on by the entity. For example, if the entity repeatedly navigates to a web site, the system can infer that the entity recommends the web site. The system can also receive recommendations from the entity from applications which are configured to ask the entity for recommendations.

Next, the system stores corresponding records for the recommendations in a lookup structure (step 304) to facilitate subsequent lookup operations.

Looking Up Recommendations

Figure 4:
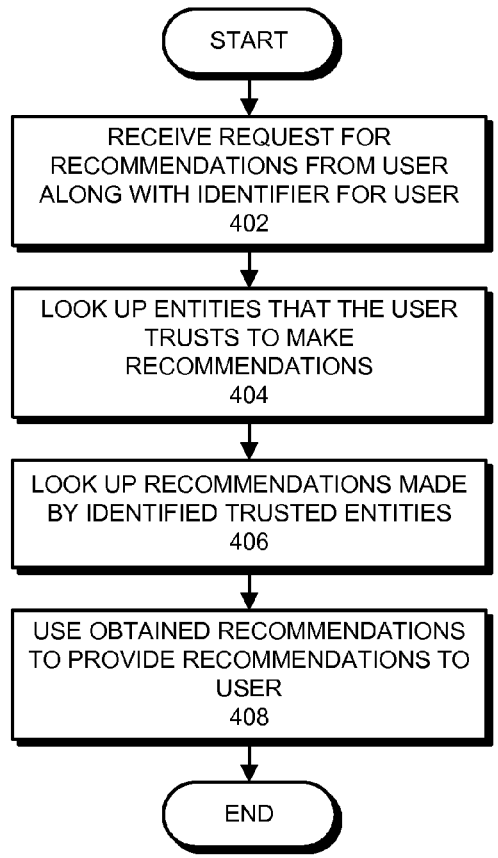
FIG. 4 presents a flow chart illustrating the process of looking up recommendations in accordance with an embodiment of the present invention.

FIG. 4 presents a flow chart illustrating the process of looking up recommendations in accordance with an embodiment of the present invention. The system first receives a request from a user to provide recommendations along with an identifier for a user (step 402). This request can be explicitly generated by the user, for example by clicking on a link or button on a web page to request the recommendations. If this web page is served up by a third-party server 126, the link or button can be located in an iframe, which is delivered by a server 122, which belongs to the system. The user can also request recommendations implicitly by inputting a query into a web browser. In this case, the returned recommendations are used to sort to the search results produced by the query.

Next, the system uses the identifier to lookup entities that the user trusts to make recommendations (step 404). In one embodiment of the present invention, the system performs performing a "topic-specific" lookup operation, which identifies trusted entities that the user trusts to make recommendations for a specific topic.

The system then looks up recommendations made by the trusted entities (step 406). In one embodiment of the present invention, this involves performing a transitive search to look up "transitively-trusted entities" who are trusted by the trusted entities or are trusted by other transitively-trusted entities. The system then obtains recommendations made by both trusted entities and transitively-trusted entities.

Finally, the system uses the obtained recommendations to provide recommendations to the user (step 408). This can involve providing the obtained recommendations directly to the user. Alternatively, the obtained recommendations can be used to influence how search results (which are associated with the obtained recommendations) are sorted and presented to the user.

Note that trust relationships can change. For example, the system can increase (or decrease) the strength of a trust relationship for a trusted entity when the user follows (or does not follow) a link for a recommendation associated with the trusted entity. The system can also cause the strength of a trust relationship to decay over time if the trust relationship is not affirmed. The system can also allow the user to edit the user's trust relationships, which can involve adding or removing trust relationships.

Basic Design Elements

The above-described system includes a number of basic "design elements" which are listed below.

System Identifier (ID)—Each user has an associated system identifier (ID), which is used by the system to manage trust relationships between users and recommendations made by users.

Persona Page—In addition to an account management page, each user also has a "persona" page that says something about him/her to others. Some existing systems, such Eopinions and Yahoo!, provide a similar type of page. However, in these existing systems, this type of page is maintained by the system, whereas the present invention can use any web page for this purpose, not necessarily pages which are maintained by the system. So, for example, a user should be able to use his home page as a "persona" page for purposes of the present invention. To map his home page to his system account, the user can add a tag to that page which identifies his system account. If a user does not have an external persona page, the system can provide an internal persona page.

This use of existing web pages is an important design element. It enables identities defined by the system to be blended into and support existing web identities. Note that although multiple pages may contain a single system tag, one of pages is preferably marked as the "primary" one. The linking between pages and ID's has several benefits. For example, the default reputation rank of a person can be his page's page rank. In this way, explicit statements about trust in a person lead naturally to personalized page rank.

Indicating Trust—Trust can be expressed in many different ways. For example, a user, Dan, can have a persona page (wherever it is located) which contains a button (served from the system). This button allows another user, Jane, to indicate that she "trusts" Dan (or if she already trusts Dan, to reset the trust). Jane can indicate that she trusts Dan by activating the trust button on his page. If Jane has her own page, she can publish information about who she trusts from her page by linking to the pages of those she trusts and adding a system-specified attribute to these links. This allows the system to incorporate trust smoothly into blog rolls, university research group pages and other places where the web contains networks of people that are reflected in links between pages. Alternatively, Jane can simply put up an XML file in some pre-specified format listing who she trusts. In this way, not only can the identity be open; trust information can also be open.

Topic Specific Reputation/Trust—Jane's trust in Dan can be topic-specific. For example, she might trust him on technology, but not on politics or travel. The topic can be expressed in free text, using ODP categories, etc., but in the end, the topic is ultimately reduced to a set of topic clusters (or something equivalent). In most cases, we expect trust statements to come from buttons on pages, from which the topic can be inferred.

Trust Upkeep and Reinforcement—It is advantageous for the system to support trust upkeep and reinforcement operations because things change. For example, a trustworthy person can go bad, or a trust statement might have been a bad choice. In one embodiment of the present invention trust is not binary value, but instead as has an associated strength measure (0-1). In this embodiment, the strength of a trust statement can decay with time, and each time the user actually follows a suggested link suggested, the strength of the trust path (more practically, the first step in the path) is boosted. This together with the time decay should help protect against spammers infiltrating trust networks.

Main System Site—The main system site contains pages for administering/editing ratings and trust relationships. In one embodiment of the present invention, the functionality in these pages is manifested in Rich Site Summary (RSS) files (or their equivalent in iframes or javascript objects) that can be incorporated into many locations. For each user (Dan), we can generate one or more RSS files summarizing the recommendations for Dan, from his network, on some topic. This RSS feed can then be incorporated anywhere. Dan can also incorporate this (probably the iframe version) into his persona page so that every one of Dan's visitors can see what his network offers. This not only provides Dan with interesting content for his page, but also enables a new user to get a good idea of what she might gain (i.e., what kind of recommendations she will get) by trusting Dan. Variants of this feed (restrictions to a particular topic, to news, etc.) can be specified by adding parameters. Examples appear in Table 1 below.

http://our.system.com/user/DanGillmor/rss?topic=Politics&contentType=News
http://our.system.com/user/DanGillmor/rss?topic=Technology&contentType=News
http://our.system.com/user/DanGillmor/rss?topic=Movies
http://our.system.com/user/DanGillmor/rss?query=Star+Wars+III&contentType=Reviews
http://our.system.com/user/DanGillmor/rss?query=related:this&contentType=Blogs Table 1

The last examples in Table 1 is a request for pages like the one containing the iframe from Dan's network. This could prove interesting in the blog context since it should retrieve blog postings on the same topic (as the referring page) from those that Dan and his network regard highly.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
   receiving a request from a first user for recommendations;
   comparing web visitation patterns of the first user and a second user;
   identifying, from the comparison, a trust relationship between the first user and the second user, wherein the trust relationship includes a trust level that indicates a strength measurement for the trust relationship, and wherein the trust relationship decays when the trust relationship is not affirmed by the first user or the second user;
   identifying one or more web sites visited by the second user based on the web visitation patterns of the second user;
   identifying recommendations from the one or more web sites based on the trust relationship;
   providing the recommendations to the first user;
   receiving input directly from the first user indicating that the first user trusts a first recommendation of the recommendations associated with the second user;
   inferring a first topic associated with the first recommendation; and
   increasing a first topic-specific trust level of the trust relationship between the first and the second user in response to receiving the input directly from the first user, the first topic-specific trust level based on the first topic.

2. The computer-implemented method of claim 1, wherein identifying the one or more web sites further comprises identifying the one or more websites visited by the second user exceeding a threshold number of visits.

3. The computer-implemented method of claim 1, further comprising adjusting the trust level of the trust relationship between the first and second users in response to subsequent interaction of the first user with one or more of the recommendations.

4. The computer-implemented method of claim 1, wherein identifying the trust relationship between the first user and the second user further comprises performing a topic-specific lookup operation which identifies the second user that the first user trusts to make recommendations for a specific topic.

5. The computer-implemented method of claim 1, further comprising using the recommendations to influence how search results associated with the recommendations are sorted and presented to the first user.

6. The computer-implemented method of claim 1, further comprising:
   receiving information indicating that the first user trusts the recommendations associated with the second user; and
   storing a corresponding record for the trust relationship between the first user and the second user in a computer-based lookup structure to facilitate subsequently identifying other users that the first user trusts to make recommendations.

7. The computer-implemented method of claim 6, wherein receiving the information indicating that the first user trusts the recommendations associated with the second user involves receiving information indicating that:
   the second user has previously made recommendations that the first user likes;
   the second user trusts one or more other users that have previously made recommendations that the first user likes; or
   the second user trusts one or more other users that the first user trusts.

8. The computer-implemented method of claim 6, wherein receiving the information indicating that the first user trusts the recommendations associated with the second user further comprises:
   receiving input directly from the first user indicating the first user trusts the recommendations associated with the second user;
   using a web crawler to examine web pages to locate information indicating that the first user trusts the recommendations associated with the second user; or
   examining computer-based records belonging to the first user, and inferring from the computer-based records that the first user trusts the recommendations associated with the second user.

9. The computer-implemented method of claim 8, wherein receiving the input directly from the first user further comprises detecting an activation of a trust button by the first user, wherein the trust button is located on a web page belonging to the second user.

10. The computer-implemented method of claim 8, wherein using the web crawler to examine the web pages further comprises using the web crawler to locate at least one of:
   links from the first user's web page to web pages belonging to trusted users;
   a XML file which identifies users that the first user trusts; or
   a vanity page which identifies users who trust the owner of the vanity page.

11. The computer-implemented method of claim 1, wherein prior to identifying the trust relationship between the first and second user, the method further comprises:

gathering the recommendations associated with the second user, wherein gathering the recommendations involves:
examining web pages associated with the second user,
examining web links which are activated by the second user, or
receiving recommendations from applications configured to gather the recommendations from the second user; and
storing records for the recommendations in a computer-based lookup structure to facilitate subsequently looking up the recommendations associated with the second user.

12. The computer-implemented method of claim 1, wherein the method further comprises decreasing the trust level between the first user and the second user over time.

13. The computer-implemented method of claim 1, further comprising:
receiving input directly from the first user indicating that the first user does not trust a second recommendation of the recommendations associated with the second user;
inferring a second topic associated with the second recommendation; and
decreasing a second topic-specific trust level of the trust relationship between the first and the second user in response to receiving the input directly from the first user, the second topic-specific trust level based on the second topic.

14. A non-transitory computer-readable storage medium storing instructions that when executed by a computer cause the computer to perform operations comprising:
receiving a request from a first user for recommendations;
comparing web visitation patterns of the first user and a second user;
identifying, from the comparison, a trust relationship between the first user and the second user, wherein the trust relationship includes a trust level that indicates a strength measurement for the trust relationship, and wherein the trust relationship decays when the trust relationship is not affirmed by the first user or the second user;
identifying one or more web sites visited by the second user based on the web visitation patterns of the second user;
identifying recommendations from the one or more web sites based on the trust relationship;
providing the recommendations to the first user;
receiving input directly from the first user indicating that the first user trusts a first recommendation of the recommendations associated with the second user;
inferring a first topic associated with the first recommendation; and
increasing a first topic-specific trust level of the trust relationship between the first and the second user in response to receiving the input directly from the first user, the first topic-specific trust level based on the first topic.

15. The computer-readable storage medium of claim 14, wherein identifying the one or more web sites further comprises identifying the one or more websites visited by the second user exceeding a threshold number of visits.

16. The computer-readable storage medium of claim 14, the operations further comprises adjusting the trust level of the trust relationship between the first and second users in response to subsequent interaction of the first user with one or more of the recommendations.

17. The computer-readable storage medium of claim 14, wherein identifying the trust relationship between the first user and the second user further comprises performing a topic-specific lookup operation which identifies the second user that the first user trusts to make recommendations for a specific topic.

18. The computer-readable storage medium of claim 14, the operations further comprising using the recommendations to influence how search results associated with the recommendations are sorted and presented to the first user.

19. The computer-readable storage medium of claim 14, the operations further comprising:
receiving information indicating that the first user trusts the recommendations associated with the second user; and
storing a corresponding record for the trust relationship between the first user and the second user in a computer-based lookup structure to facilitate subsequently identifying other users that the first user trusts to make recommendations.

20. The computer-readable storage medium of claim 19, wherein receiving the information indicating that the first user trusts the recommendations associated with the second user involves receiving information indicating that:
the second user has previously made recommendations that the first user likes;
the second user trusts one or more other users that have previously made recommendations that the first user likes; or
the second user trusts one or more other users that the first user trusts.

21. The computer-readable storage medium of claim 19, wherein receiving the information indicating that the first user trusts the recommendations associated with the second user further comprises:
receiving input directly from the first user indicating the first user trusts the recommendations associated with the second user;
using a web crawler to examine web pages to locate information indicating that the first user trusts the recommendations associated with the second user; or
examining computer-based records belonging to the first user, and inferring from the computer-based records that the first user trusts the recommendations associated with the second user.

22. The computer-readable storage medium of claim 21, wherein receiving the input directly from the first user further comprises detecting an activation of a trust button by the first user, wherein the trust button is located on a web page belonging to the second user.

23. The computer-readable storage medium of claim 21, wherein using the web crawler to examine the web pages further comprises using the web crawler to locate at least one of:
links from the first user's web page to web pages belonging to trusted users;
a XML file which identifies users that the first user trusts; or
a vanity page which identifies users who trust the owner of the vanity page.

24. The computer-readable storage medium of claim 14, wherein prior to identifying the trust relationship between the first and second user, the operations further comprises:
gathering the recommendations associated with the second user, wherein gathering the recommendations involves:
examining web pages associated with the second user,
examining web links which are activated by the second user, or
receiving recommendations from applications configured to gather the recommendations from the second user; and storing records for the recommendations in a computer-based lookup structure to facilitate subsequently looking up the recommendations associated with the second user.

25. The computer-readable storage medium of claim 14, the operations further comprises decreasing the trust level between the first user and the second user over time.

26. The computer-readable storage medium of claim 14, the operations further comprising:
receiving input directly from the first user indicating that the first user does not trust a second recommendation of the recommendations associated with the second user;
inferring a second topic associated with the second recommendation; and
decreasing a second topic-specific trust level of the trust relationship between the first and the second user in response to receiving the input directly from the first user, the second topic-specific trust level based on the second topic.

27. A system comprising:
a computing device; and
a computer-readable medium coupled to the computing device and having instructions stored thereon which, when executed by the computing device, cause the computing device to perform operations comprising:
receiving a request from a first user for recommendations;
comparing web visitation patterns of the first user and a second user;
identifying, from the comparison, a trust relationship between the first user and the second user, wherein the trust relationship includes a trust level that indicates a strength measurement for the trust relationship, and wherein the trust relationship decays when the trust relationship is not affirmed by the first user or the second user;
identifying one or more web sites visited by the second user based on the web visitation patterns of the second user;
identifying recommendations from the one or more web sites based on the trust relationship;
providing the recommendations to the first user;
receiving input directly from the first user indicating that the first user trusts a first recommendation of the recommendations associated with the second user;
inferring a first topic associated with the first recommendation; and
increasing a first topic-specific trust level of the trust relationship between the first and the second user in response to receiving the input directly from the first user, the first topic-specific trust level based on the first topic.

28. The system of claim 27, wherein identifying the one or more web sites further comprises identifying the one or more websites visited by the second user exceeding a threshold number of visits.

29. The system of claim 27, the operations further comprises adjusting the trust level of the trust relationship between the first and second users in response to subsequent interaction of the first user with one or more of the recommendations.

30. The system of claim 27, wherein identifying the trust relationship between the first user and the second user further comprises performing a topic-specific lookup operation which identifies the second user that the first user trusts to make recommendations for a specific topic.

31. The system of claim 27, the operations further comprising using the recommendations to influence how search results associated with the recommendations are sorted and presented to the first user.

32. The system of claim 27, the operations further comprising:
receiving information indicating that the first user trusts the recommendations associated with the second user; and
storing a corresponding record for the trust relationship between the first user and the second user in a computer-based lookup structure to facilitate subsequently identifying other users that the first user trusts to make recommendations.

33. The system of claim 32, wherein receiving the information indicating that the first user trusts the recommendations associated with the second user involves receiving information indicating that:
the second user has previously made recommendations that the first user likes;
the second user trusts one or more other users that have previously made recommendations that the first user likes; or
the second user trusts one or more other users that the first user trusts.

34. The system of claim 32, wherein receiving the information indicating that the first user trusts the recommendations associated with the second user further comprises:
receiving input directly from the first user indicating the first user trusts the recommendations associated with the second user;
using a web crawler to examine web pages to locate information indicating that the first user trusts the recommendations associated with the second user; or
examining computer-based records belonging to the first user, and inferring from the computer-based records that the first user trusts the recommendations associated with the second user.

35. The system of claim 34, wherein receiving the input directly from the first user further comprises detecting an activation of a trust button by the first user, wherein the trust button is located on a web page belonging to the second user.

36. The system of claim 34, wherein using the web crawler to examine the web pages further comprises using the web crawler to locate at least one of:
links from the first user's web page to web pages belonging to trusted users;
a XML file which identifies users that the first user trusts; or
a vanity page which identifies users who trust the owner of the vanity page.

37. The system of claim 27, wherein prior to identifying the trust relationship between the first and second user, the operations further comprises:
gathering the recommendations associated with the second user, wherein gathering the recommendations involves:
examining web pages associated with the second user,
examining web links which are activated by the second user, or
receiving recommendations from applications configured to gather the recommendations from the second user; and
storing records for the recommendations in a computer-based lookup structure to facilitate subsequently looking up the recommendations associated with the second user.

38. The system of claim 27, the operations further comprises decreasing the trust level between the first user and the second user over time.

39. The system of claim 27, the operations further comprising:
  receiving input directly from the first user indicating that the first user does not trust a second recommendation of the recommendations associated with the second user;
  inferring a second topic associated with the second recommendation; and
  decreasing a second topic-specific trust level of the trust relationship between the first and the second user in response to receiving the input directly from the first user, the second topic-specific trust level based on the second topic.

* * * * *